(12) United States Patent
Ono et al.

(10) Patent No.: US 11,374,219 B2
(45) Date of Patent: Jun. 28, 2022

(54) PRIMARY BATTERY AND MOISTURE SENSOR

(71) Applicant: Nippon Telegraph and Telephone Corporation, Tokyo (JP)

(72) Inventors: Yoko Ono, Atsugi (JP); Masaya Nohara, Atsugi (JP); Mikayo Iwata, Atsugi (JP); Masahiko Hayashi, Atsugi (JP); Takeshi Komatsu, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 201 days.

(21) Appl. No.: 16/338,950

(22) PCT Filed: Nov. 14, 2017

(86) PCT No.: PCT/JP2017/040935
§ 371 (c)(1),
(2) Date: Apr. 2, 2019

(87) PCT Pub. No.: WO2018/092773
PCT Pub. Date: May 24, 2018

(65) Prior Publication Data
US 2020/0395610 A1  Dec. 17, 2020

(30) Foreign Application Priority Data

Nov. 16, 2016  (JP) .............................. JP2016-222906

(51) Int. Cl.
*H01M 4/46* (2006.01)
*H01M 4/42* (2006.01)
(Continued)

(52) U.S. Cl.
CPC ............. *H01M 4/463* (2013.01); *H01M 4/42* (2013.01); *H01M 4/466* (2013.01); *H01M 6/32* (2013.01);
(Continued)

(58) Field of Classification Search
CPC ........ H01M 4/463; H01M 4/42; H01M 4/466; H01M 4/406; H01M 6/32;
(Continued)

(56) References Cited

U.S. PATENT DOCUMENTS 5,462,816 A * 10/1995 Okamura ............ H01M 12/065
429/469
7,081,142 B1 * 7/2006 Carlson ................. H01M 4/136
29/623.5

(Continued)

FOREIGN PATENT DOCUMENTS

CN    1494173 A    5/2004
CN  101009368 A    8/2007

(Continued)

OTHER PUBLICATIONS

Translation of KR20060041559, Open Type thin film cell, LG Household Application submitted 2004 (Year: 2006).*

(Continued)

*Primary Examiner* — Maria Laios
*Assistant Examiner* — Adam J Francis
(74) *Attorney, Agent, or Firm* — Kilpatrick Townsend & Stockton LLP

(57) ABSTRACT

Provided are an easy-to-handle primary battery capable of spontaneous power generation and a moisture sensor including the same. The primary battery includes a separator that is disposed between a negative electrode and negative electrode current collector (a negative electrode) and a positive electrode and positive electrode current collector (a positive electrode), and sucks up electrolyte solution by the capillary phenomenon with an exposed portion of the separator 5 exposed from battery casings.

6 Claims, 7 Drawing Sheets

(51) Int. Cl.
*H01M 6/32* (2006.01)
*H01M 50/46* (2021.01)
*H01M 4/02* (2006.01)

(52) U.S. Cl.
CPC ...... *H01M 50/46* (2021.01); *H01M 2004/027* (2013.01); *H01M 2004/028* (2013.01)

(58) Field of Classification Search
CPC ..... H01M 2004/027; H01M 2004/028; H01M 6/30; H01M 6/34; H01M 12/06; H01M 12/04; H01M 6/36
See application file for complete search history.

(56) References Cited

U.S. PATENT DOCUMENTS

| | | | |
|---|---|---|---|
| 2003/0059681 A1 | 3/2003 | Noh | |
| 2004/0106037 A1 | 6/2004 | Cho et al. | |
| 2004/0131934 A1* | 7/2004 | Sugnaux | H01M 4/362 429/209 |
| 2010/0075215 A1* | 3/2010 | Zhang | H01M 4/622 429/144 |
| 2010/0203394 A1* | 8/2010 | Bae | H01M 6/34 429/246 |
| 2015/0283281 A1 | 10/2015 | Iwaki et al. | |
| 2016/0056477 A1* | 2/2016 | Dannoura | H01M 4/466 429/118 |

FOREIGN PATENT DOCUMENTS

| | | | | |
|---|---|---|---|---|
| JP | 4664/1988 | | 1/1988 | |
| JP | 7-130406 A | | 5/1995 | |
| JP | 9-183400 A | | 7/1997 | |
| JP | 2003-151633 A | | 5/2003 | |
| JP | 2003-257509 A | | 9/2003 | |
| JP | 2004-158453 A | | 6/2004 | |
| JP | 2006-053057 A | | 2/2006 | |
| JP | 2006053057 B2 | * | 2/2006 | ............. G01M 3/16 |
| JP | 2010-73338 A | | 4/2010 | |
| JP | 2014-196919 A | | 10/2014 | |
| JP | 2014-203810 A | | 10/2014 | |
| JP | 2015-32379 A | | 2/2015 | |
| JP | 2015032379 A | * | 2/2015 | |
| JP | 2015-197392 A | | 11/2015 | |
| JP | 2015-201441 A | | 11/2015 | |
| KR | 20060041559 | * | 11/2004 | ............. Y02E 60/10 |
| KR | 2006-0041559 A | | 5/2006 | |
| KR | 100690015 B1 | | 3/2007 | |
| WO | 2007/116872 A1 | | 10/2007 | |

OTHER PUBLICATIONS

Translation of JP2006053057, Water Leakage Sensor, and Water Leakage Detecting System, 2006, Nippon Telegr & Teleph Corp. (Year: 2006).*

English Translation of JP 2015032379 A—Battery Separator—Galaxy Corp. Feb. 16, 2015 (Year: 2015).*

Office Action, Japanese Patent Application No. 2018-551644, dated Apr. 14, 2020.

International Preliminary Report on Patentability, PCT Patent Application No. PCT/JP2017/040935, dated May 31, 2019.

International Search Report, PCT Patent Application No. PCT/JP2017/040935, dated Feb. 6, 2018.

Written Opinion, PCT Patent Application No. PCT/JP2017/040935, dated Feb. 6, 2018.

"Anti-Disaster Products Including Water Batteries, NOPOPO, a Three-Water-Battery Set for Disaster Situations", Aqua Power System Japan, [online], [retrieved on Oct. 31, 2016] retrieved from <URL: http://www.aps-j.jp/pdf/NWPx3.pdf>.

* cited by examiner

FIG. 8

| TEST | AVERAGE DISCHARGE VOLTAGE (V) | DISCHARGE CAPACITY (mAh/g) |
|---|---|---|
| EXAMPLE 1 | 1.15 | 1050 |
| EXAMPLE 2 | 1.32 | 1700 |
| EXAMPLE 3 | 1.25 | 1470 |
| EXAMPLE 4 | 1.30 | 1690 |
| EXAMPLE 5 | 0.8 | 550 |
| EXAMPLE 6 | 0.45 | 1120 |
| EXAMPLE 7 | 0.7 | 390 |
| COMPARATIVE EXAMPLE 1 | 1.27 | 130 |
| COMPARATIVE EXAMPLE 2 | 1.05 | 420 |

PRIMARY BATTERY AND MOISTURE SENSOR

TECHNICAL FIELD

The present invention relates to primary batteries and moisture sensors including primary batteries.

BACKGROUND ART

Conventionally, alkaline batteries, manganese batteries, and air batteries have been widely used as disposal batteries. In recent years, with the development of IoT (Internet of Things), development has been progressing for sensors of scattering types that are set and used at various kinds of places in the natural world, such as in the soil and in forests, and small, high-performance lithium-ion batteries that can be used for these sensors and various other applications are also widely used.

In such conventional primary batteries, the electrodes are always immersed in electrolyte solution, thus unfortunately causing self-discharge. In addition, a strongly alkaline solution such as an aqueous solution of sodium hydroxide or an organic electrolyte is used as the electrolyte, on which safety and environmental problems have been pointed out, and thus it is not easy to handle these conventional primary batteries.

To address these problems, batteries into which an electrolyte can be injected from outside when they are used are currently being developed. For example, according to non-patent document 1, a small water battery that can be used simply by putting water into it through an injection port has been commercialized.

PRIOR ART DOCUMENT

Non-Patent Document

Non-patent document 1: "anti-disaster products including water batteries, NOPOPO, a three-water-battery set for disaster situations", Aqua Power System Japan, [online], [retrieved on Oct. 31, 2016] retrieved from <URL: http://www.aps-j.jp/pdf/NWPx3.pdf>

SUMMARY OF THE INVENTION

Problem to be Solved by the Invention

Unfortunately, it is difficult to inject water into a small water battery described above without causing leakage because an eye dropper is necessary to do it. In addition, the electrolyte may leak from the injection port. Further, since water needs to be injected manually, spontaneous power generation using natural water in the surrounding environment cannot be expected.

The present invention has been made in view of the above situations, an objective thereof is to provide an easy-to-handle primary battery capable of spontaneous power generation and a moisture sensor including the same.

Means for Solving the Problem

To solve the above problems, a primary battery according to claim 1 includes: a positive electrode and a negative electrode; and a separator that is disposed between the positive electrode and the negative electrode and sucks up electrolyte solution by a capillary phenomenon with an exposed portion of the separator exposed from a battery casing.

Since the present invention includes the separator which sucks up electrolyte solution by the capillary phenomenon with the exposed portion exposed from the battery casing, the present invention provides an easy-to handle primary battery capable of spontaneous power generation in which self-discharge does not occur before use, and it requires only a small amount of electrolyte solution in use and is free from concerns about liquid leakage.

A primary battery according to claim 2 includes: a positive electrode and a negative electrode; and a separator that is disposed between the positive electrode and the negative electrode, contains an electrolyte, and sucks up water by a capillary phenomenon with an exposed portion of the separator exposed from a battery casing.

Since the present invention includes the separator which contains an electrolyte and sucks up water by the capillary phenomenon with the exposed portion exposed from the battery casing, the present invention provides an easy-to handle primary battery capable of spontaneous power generation in which self-discharge does not occur before use, and it requires only a small amount of water in use and is free from concerns about liquid leakage.

A primary battery according to claim 1 or 2, includes a separator containing no electrolyte, a separator containing an electrolyte, and a separator containing no electrolyte stacked in order.

A primary battery according to claim 3 is the primary battery according to claim 1, in which the negative electrode is made of any metal selected from magnesium, zinc, aluminum, and iron, or made of an alloy containing the metal as a main component.

A primary battery according to claim 1 or 2, in which material of the positive electrode has a structure of a stretchable bicontinuous material having a three-dimensional network structure.

A primary battery according to claim 4 is the primary battery according to claim 1, in which the exposed portion of the separator is exposed on a side opposite from a side on which a portion of a positive electrode current collector of the positive electrode and a portion of a negative electrode current collector of the negative electrode are exposed from the battery casing.

A primary battery according to claim 5 is the primary battery according to claim 1, further including a battery casing in an inside of which the positive electrode, the negative electrode, and the separator are disposed and which has an intake port to take air into the inside.

A moisture sensor according to claim 6 includes: a positive electrode and a negative electrode; a separator that is disposed between the positive electrode and the negative electrode, contains an electrolyte, and sucks up water by a capillary phenomenon with an exposed portion of the separator exposed from a battery casing; and a sensor that detects conduction between the positive electrode and the negative electrode as presence of water, the conduction being caused by the separator sucking up the water.

Effect of the Invention

The present invention provides an easy-to-handle primary battery capable of spontaneous power generation and a moisture sensor including the same.

BRIEF DESCRIPTION OF THE DRAWINGS

FIG. 8 is a table showing measurement results of the average discharge voltage and the discharge capacity.

MODE FOR CARRYING OUT THE INVENTION

An embodiment using the present invention will be described with reference to the drawings.

Figure 1A:
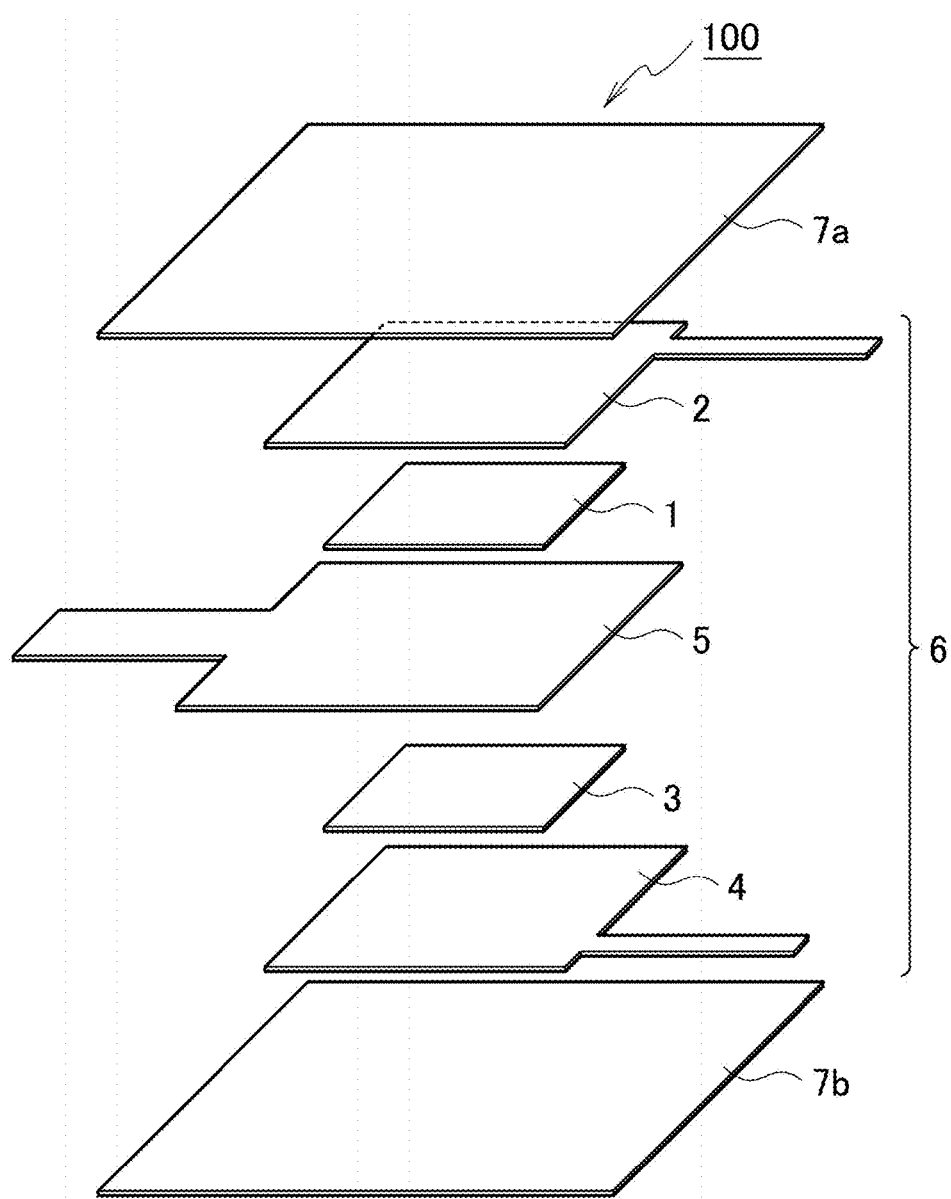
FIG. 1(a) and FIG. 1(b) are diagrams illustrating a structure example of a primary battery (collectively referred to as FIG. 1).
Figure 1B:
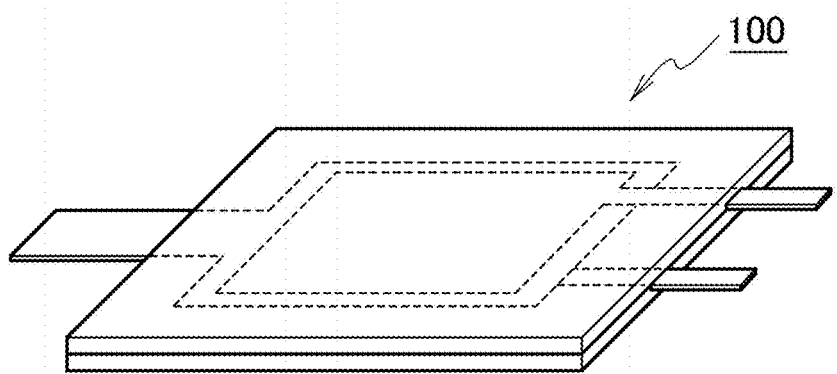

FIG. 1 is a diagram illustrating a structure example of a primary battery 100 according to the present embodiment. Part (a) shows the constituents of the primary battery 100; part (b) shows the primary battery 100 in use. The primary battery 100 includes a positive electrode 1 and a positive electrode current collector 2, a negative electrode 3 and a negative electrode current collector 4 opposed to the positive electrode 1 and the positive electrode current collector 2, a separator 5 disposed between the positive electrode 1 and the negative electrode 3, and a positive-electrode-side casing 7a and a negative-electrode-side casing 7b that are opposed to each other and cover all the constituents (1 to 5). All the constituents (1 to 5, 7a, and 7b) have flat plate shapes, and a relative or absolute size of each constituent is, for example, as illustrated in FIG. 1. Note that the constituents (1 to 5) are collectively called a battery cell 6. A positive electrode or a negative electrode means a positive or negative electrode; an electrode means a conductor or an element. Thus, the word, "a positive electrode" or "a negative electrode", includes an element as an object (for example, an electrode element such as an electrode plate).

The separator 5 separates the positive electrode 1 and the negative electrode 3 from each other and is made of insulating and water absorbing material that sucks up electrolyte solution or water by the capillary phenomenon. The portion of the separator 5 other than the faces covered by the casings 7a and 7b is exposed to the atmosphere. Specifically, the portion other than the upper face in contact with the positive electrode 1 and the positive electrode current collector 2 and the lower face in contact with the negative electrode 3 and the negative electrode current collector 4 is exposed to the atmosphere. In FIG. 1, the portion in a band shape extending to the left in the separator 5 is the exposed portion. In FIG. 1, the portion of the separator 5 is exposed on the opposite side from the exposed portions of the positive electrode current collector 2 and the negative electrode current collector 4 described later are exposed. In other words, the exposed portion of the separator 5 is provided on the opposite side from the terminals of the positive electrode 1 and the negative electrode 3.

The positive electrode 1 and the positive electrode current collector 2 are the positive electrode of the primary battery 100. The positive electrode current collector 2 also has a portion exposed to the atmosphere. Specifically, the portion other than the lower face in contact with the positive electrode 1 and the upper face in contact with the positive-electrode-side casing 7a is exposed to the atmosphere. In FIG. 1, the portion in a band shape extending to the right in the positive electrode current collector 2 is the exposed portion (the terminal of the positive electrode).

The negative electrode 3 and the negative electrode current collector 4 are the negative electrode of the primary battery 100. The negative electrode current collector 4 also has a portion exposed to the atmosphere. Specifically, the portion other than the upper face in contact with the negative electrode 3 and the lower face in contact with the negative-electrode-side casing 7b is exposed to the atmosphere. In FIG. 1, the portion in a band shape extending to the right in the negative electrode current collector 4 is the exposed portion (the terminal of the negative electrode).

The primary battery 100 having the structure described above sucks up electrolyte solution by the capillary phenomenon from the exposed portion of the separator 5 exposed to the outside of the battery casings 7a and 7b to take in the electrolyte solution to the inside of the casings 7a and 7b. The electrolyte solution taken in is brought into contact with the positive electrode 1 and the negative electrode 3 to start generating electricity. In summary, the primary battery 100 illustrated in FIG. 1 includes the separator which sucks up the electrolyte solution by the capillary phenomenon from the portion exposed from the casings 7a and 7b, providing an easy-to-handle primary battery capable of spontaneous power generation.

Figure 2:
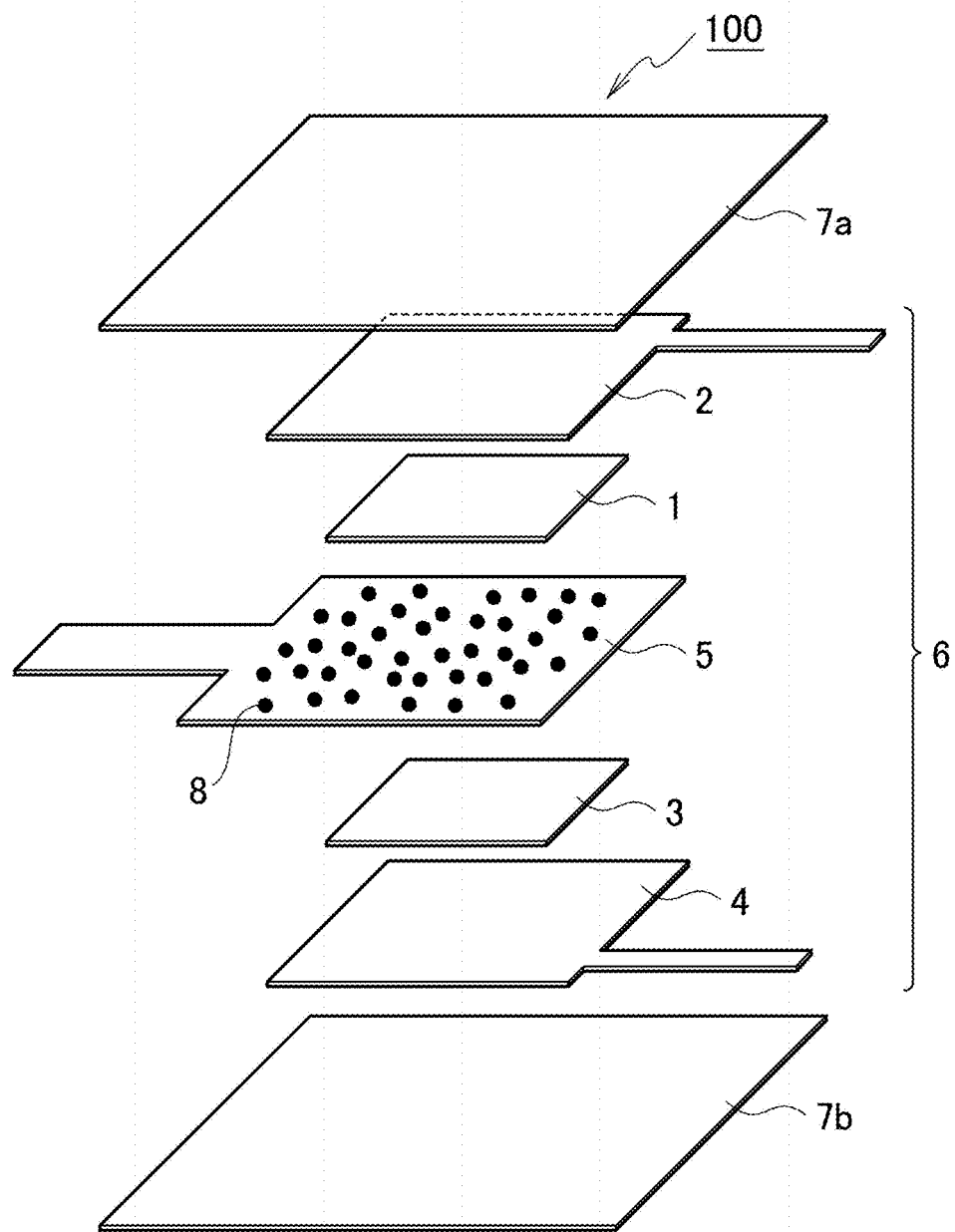
FIG. 2 is a diagram illustrating a structure example of a primary battery.

FIG. 2 is a diagram illustrating another structure example of a primary battery 100. In this primary battery 100, a positive electrode 1 is of a gas diffusion type, a negative electrode 3 contains magnesium, and a separator 5 contains an electrolyte 8. The constituents other than these are the same as those of the primary battery 100 illustrated in FIG. 1.

Figure 3:
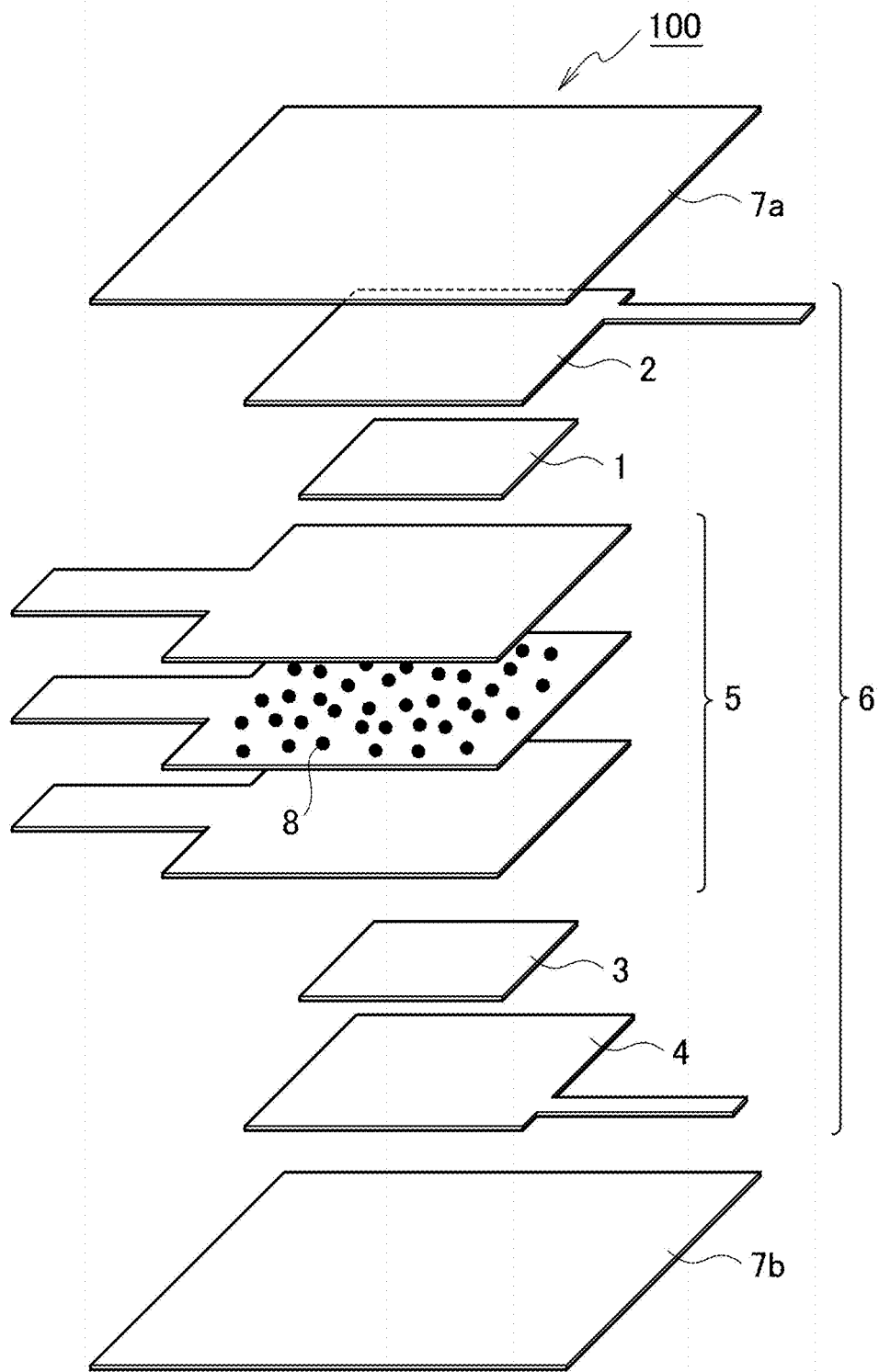
FIG. 3 is a diagram illustrating a structure example of a primary battery.

FIG. 3 is a diagram illustrating another example of the structure of a primary battery 100. In this primary battery 100, a separator 5 is a layered separator including a separator containing no electrolyte, a separator containing an electrolyte 8, and a separator containing no electrolyte that are stacked in order. The constituents other than these are the same as those of the primary battery 100 illustrated in FIG. 1 or in FIG. 2.

In the primary batteries 100 illustrated in FIGS. 2 and 3, the separator 5 contains the electrolyte 8 from the beginning and does not need to sucks up the electrolyte solution from the exposed portion of the separator 5. Thus, the primary batteries 100 in FIGS. 2 and 3 can start generation simply by sucking up water (including natural water). In summary, the primary batteries 100 illustrated in FIGS. 2 and 3 include the separator 5 which contains an electrolyte and sucks up water by the capillary phenomenon from the portion exposed from the casings 7a and 7b, providing an easy-to-handle primary battery capable of spontaneous power generation.

Next, the constituents of the primary battery 100 illustrated in FIGS. 1 to 3 will be described.

The separator 5 may be any insulator having a water absorption property. For example, a coffee filter, a paper towel, plain paper, or the like may be used for it. Besides, considering the natural environment, a sheet made of a material that has a certain strength and decomposes naturally, such as a cellulose-based separator made of plant fibers, may be used.

The casings 7a and 7b are not limited to specific materials or shapes as long as the materials are capable of holding the battery cell 6 inside. For example, casings of a laminate film type may be used. In the case where the casings 7a and 7b are made of a material that decomposes naturally, the material may be any of natural product-based, microorganism-based, and chemical synthesis product-based. The material may be, for example, polylactic acid, polycaprolactone, polyhydroxyalkanoate, polyglycolic acid, modified polyvinyl alcohol, casein, and modified starch. In particular, a chemical synthesis product-based material such as plant-derived polylactic acid is preferable. The casings 7a and 7b may have any shapes as long as the shapes can be obtained by processing biodegradable plastics. Materials applicable to the casings 7a and 7b include not only commercially available biodegradable plastic films but also a sheet of paper on which a resin film, such as polyethylene, is formed, used for milk cartons and the like, and an agar film.

The positive-electrode-side casing 7a and the negative-electrode-side casing 7b made of a material listed above are bonded at the peripheral edge portions of the battery cell 6 to seal the battery cell 6 inside the casing. The bonding method is not limited to specific ones but includes a method by heat-sealing or a method using an adhesive. If it is difficult to bond the casings 7a and 7b to each other by heat-sealing, it is preferable to use an adhesive. If an air hole is formed on the casings 7a and 7b in advance, or if a portion of the peripheral edge portions is left open without bonding it, in other words, if an intake port to take air inside is formed at a portion of the wall faces of the casings 7a and 7b, the air can be taken in.

Note that the shapes of the positive electrode 1, positive electrode current collector 2, negative electrode 3, negative electrode current collector 4, separator 5, and casings 7a and 7b are not limited to specific ones as long as the shapes do not impair functions for operating as a battery. For example, shapes that can be used include a sheet in a rectangular or circular shape in plan view or a roll shape.

Next, the positive electrode 1 and the negative electrode 3 will be described in detail. For the positive electrode 1, a conductive material used for the positive electrode of a widely well-known metal-air battery may be used. The examples include carbon materials but are not limited to them.

The positive electrode 1 can be produced by a known process, such as molding carbon powder with a binder. Here, it is important for the primary battery 100 to generate a large number of reaction sites inside the positive electrode 1, and thus it is preferable that the positive electrode 1 have a high specific surface area. In the case where the positive electrode 1 is produced by molding carbon powder with a binder and pelletizing it, if the material has a high specific surface area, the bonding strength between carbon powders is low, and the structure may be degraded. This may make it difficult to discharge stably, decreasing the discharge capacity. Therefore, for example, use of a positive electrode having a three-dimensional network structure eliminates the need for using the binder and makes it possible to increase the discharge capacity. It is preferable that a positive electrode having such a three-dimensional network structure be made of a bicontinuous material having pores with an average diameter of 5 nm to 10 μm (for example, carbon nanofibers described later) and that the BET specific surface area be larger than or equal to 20 m²/g. Further, it is preferable that when a strain that expands or contracts the length of the positive electrode in the load direction by 80% or less is applied to the positive electrode by tensile stress or compressive stress, the stress of the positive electrode do not go out of the elastic range, and the positive electrode be capable of going back to the shape before the stress application.

The positive electrode 1 may carry a catalyst. The carried catalyst is not limited to specific ones, but it is preferable that the carried catalyst contain, for example, at least one metal selected from Fe, Mn, Zn, Cu, and Mo or contain a metal oxide made from at least one metal selected from Ca, Fe, Mn, Zn, Cu, and Mo. In particular, Fe, Mn, and Zn are preferable as metal, and an oxide made from one of these or a composite oxide made from two or more of these is preferable. In particular, manganese oxide ($MnO_2$) is preferred.

Next, the negative electrode 3 will be described. The negative electrode 3 is made of a negative electrode active material. This negative electrode active material only needs to be a material that can be used for a negative electrode of a primary battery and is not limited to specific ones. Examples of the material include one or more kinds of metals selected from magnesium, zinc, aluminum, and iron or an alloy containing one or more kinds of metals selected from these metals as main components. The negative electrode 3 can be produced by a known method. For example, a commercially available plate or foil made of a metal or an alloy, formed into a predetermined shape can be used.

Next, the electrolyte 8 will be described. The electrolyte 8 only needs to be a substance which allows metal ions and hydroxide ions to move between the positive electrode 1 and the negative electrode 3. The material of the electrolyte 8 is not limited to specific ones. It is preferable that the material contain, for example, chloride such as sodium chloride, potassium chloride, and magnesium chloride; acetate such as acetic acid, sodium acetate, potassium acetate, magnesium acetate anhydrate, and magnesium acetate tetrahydrate; citrate such as citric acid, sodium citrate, potassium citrate, and magnesium citrate; carbonate such as sodium carbonate, potassium carbonate, and magnesium carbonate; pyrophosphate such as sodium pyrophosphate, potassium pyrophosphate, and magnesium pyrophosphate; metaphosphate such as sodium metaphosphate, potassium metaphosphate, and magnesium metaphosphate; and, in addition to those listed above, phosphoric acid, carbonic acid, HEPES (4-(2-hydroxyethyl)-1-piperazineethanesulfonic acid), and the like.

Next, the positive electrode current collector 2 and the negative electrode current collector 4 will be described. The positive electrode current collector 2 can be a known one. For example, a carbon sheet, carbon cloth, and a plate made of Fe, Cu, or Al may be used for the material. The negative electrode current collector 4 can also be a known one, but in the case of using a metal for the negative electrode, the terminal located outside may be formed directly from the negative electrode 3 instead of using the negative electrode current collector 4.

Here, electrode reactions of the positive electrode 1 and the negative electrode 3 will be described taking the case of a primary battery 100 including a negative electrode made of a magnesium metal, as an example. In the positive electrode reaction, when oxygen in the air and the electrolyte come into contact with each other on the surface of the positive electrode 1 having conductivity, the reaction expressed by formula (1) occurs.

$$\tfrac{1}{2}O_2 + H_2O + 2e^- \rightarrow 2OH^- \qquad (1)$$

In the negative electrode reaction, the reaction expressed by formula (2) occurs at the negative electrode 3 which is in contact with the electrolyte supplied by the separator 5, and magnesium of which the negative electrode 3 is made emits electrons and dissolves as magnesium ions into the electrolyte.

$$Mg \rightarrow Mg^{2+} + 2e^- \qquad (2)$$

These reactions enable discharging. The total reaction is expressed by formula (3), which is a reaction that forms (precipitates) magnesium hydroxide. The theoretical electromotive force is approximately 2.7 V.

$$Mg + \tfrac{1}{2}O_2 + H_2O + 2e^- \rightarrow Mg(OH)_2 \qquad (3)$$

Since the reaction expressed by formula (1) occurs on the surface of the positive electrode 1 as described above, it is conceivably preferable that a large number of reaction sites be generated inside the positive electrode 1 in the primary battery 100.

With the structure described above, in the case where the primary battery 100 made of materials that decompose naturally is used for, for example, a disposable device such as a moisture sensor for the soil, the primary battery 100 decomposes naturally over time, eliminating the need for retrieving the battery. In addition, since the primary battery 100 is made of natural origin materials or fertilizer components; when it is used in the natural world such as in forests or in the sea in addition to in the soil, the environmental load is very low.

Figure 4:
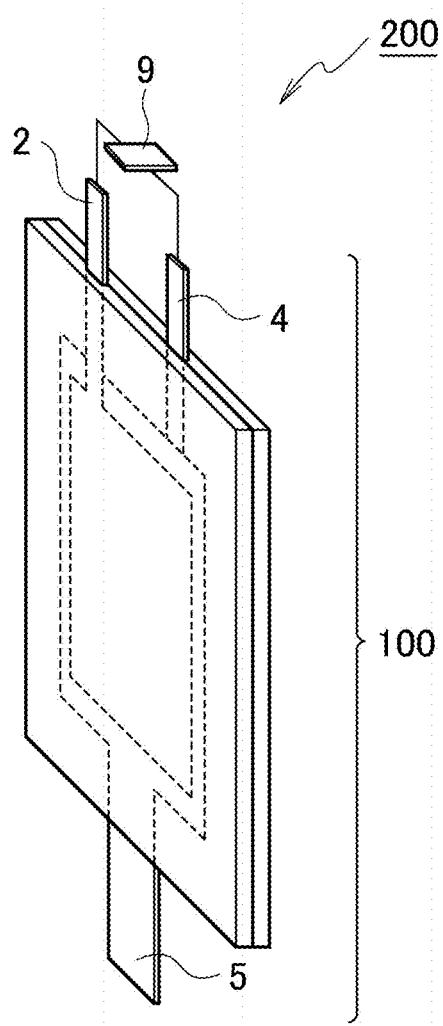
FIG. 4 is a diagram illustrating a structure example of a moisture sensor.

Next, description will be provided for applications of the primary battery 100 described above. Although the primary battery 100 described above can be used in general as a power source, in the present embodiment, description will be provided for a case where the primary battery 100 is used as a moisture sensor for detecting the presence of moisture. FIG. 4 is a diagram illustrating a structure example of a moisture sensor 200. The moisture sensor 200 includes a primary battery 100 and an alarm 9 connected between the positive electrode current collector 2 and the negative electrode current collector 4 of the primary battery 100.

The structure of the primary battery 100 is as described above. The positive electrode current collector 2 and the negative electrode current collector 4 disposed away from each other not to be in contact serve as the electrodes of the moisture sensor 200, which detect the conduction between the positive electrode current collector 2 and the negative electrode current collector 4 as the presence of water. In other words, the moisture sensor 200 has electric structure.

When no water exists at the exposed portion of a separator 5, the positive electrode current collector 2 and the negative electrode current collector 4 are insulated from each other. On the other hand, when the presence of water electrically connects the positive electrode current collector 2 and the negative electrode current collector 4 to each other, the alarm 9 performs an alarm operation. The alarm 9 raises an alarm sound with a large volume to notify people around it or transmits radio waves to notify a remote device. The alarm 9 is an example to illustrate a sensor that has a moisture detection function.

Hereinafter, description will be provided for examples of the primary battery 100 describe until now.

Example 1

In example 1, a primary battery 100 in FIG. 1 including a positive electrode 1 made of carbon nanofibers was prepared.
(Preparation of Positive Electrode)

Figure 5:
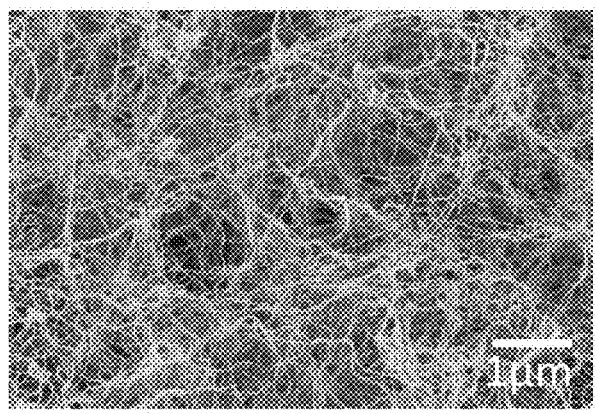
FIG. 5 is diagram illustrating an SEM image of carbon nanofibers.

First, a method of preparing the positive electrode 1 will be described. A commercially available carbon nanofiber sol [dispersion medium: water (H$_2$O), 0.4 weight %, manufactured by Sigma-Aldrich] was put into a test tube, and this test tube was immersed in liquid nitrogen for 30 minutes to completely freeze the carbon nanofiber sol. After the carbon nanofiber sol was completely frozen, the frozen carbon nanofiber sol was taken out and put into an eggplant shaped flask, which was dried in a vacuum of 10 Pa or less using a freeze dryer (manufactured by TOKYO RIKAKIKAI CO., LTD.) to obtain a stretchable bicontinuous material containing carbon nanofibers and having a three-dimensional network structure. FIG. 5 is an SEM (Scanning Electron Microscope) image of this stretchable bicontinuous material. It can be understood from the image that linear carbon nanofibers (the material of the positive electrode 1) are three-dimensionally formed to have a continuous and integral structure (the structure of a bicontinuous material). It can also be understood that the bicontinuous material is stretchable because branched or crimped fibers in wave shapes, in curl shapes, and in coil shapes have a three-dimensional network structure and play a role as springs. The inventor has confirmed that after tensile stress or compressive stress is applied to the stretchable bicontinuous material obtained by the above preparation method, the bicontinuous material is restored to the shape before the stress application.

Next, a method of preparing the primary battery 100 will be described.

The positive electrode 1 used was prepared by cutting out a circle shape with a diameter of 17 mm from the above stretchable bicontinuous material using a punch. The positive electrode current collector 2 used was prepared by cutting out a shape having a 20 mm×20 mm square with a tab for current collection from carbon cloth.

The negative electrode 3 was prepared by cutting out a shape having a 20 mm×20 mm square with a tab for current collection from a commercially available magnesium alloy plate AZ31B (thickness 300 μm, manufactured by NIPPON KINZOKU CO., LTD.) using scissors. In example 1, an exposed portion for current collection is formed in the negative electrode 3 itself instead of using the negative electrode current collector 4.

The separator 5 used was prepared by cutting out a 20 mm×20 mm square with a portion that is exposed to the outside of the casing and sucks up water, from a cellulosic separator for batteries (manufactured by NIPPON KODOSHI CORPORATION).

For the casings 7a and 7b, a film sheet, ECOLOJU (manufactured by Mitsubishi Plastics, Inc.), was used. By cutting this sheet, two cut sheets each having a 30 mm×30 mm shape in plan view were prepared. One sheet was used as the positive-electrode-side casing 7a, and the other as the negative-electrode-side casing 7b.

The negative electrode 3 and the separator 5 are placed on the negative-electrode-side casing 7b, and on top of them, the positive electrode 1, positive electrode current collector 2, and positive-electrode-side casing 7a were placed in order. After that, the peripheral edge portions of the two casings 7a and 7b were sealed by heat-sealing at 130° C. with a sealer. Here, a portion of the peripheral edge portions (for example, approximately 10 mm) of the casings 7a and 7b was not sealed to form an air hole. The primary battery 100 thus obtained weighed approximately 0.5 g.
(Evaluation of Battery)

The battery performance of the prepared primary battery 100 was measured. For electrolyte solution, a solution prepared by dissolving sodium chloride (NaCl, manufactured by KANTO CHEMICAL CO., INC.) in pure water at a concentration of 1 mol/L was used.

Figure 6:
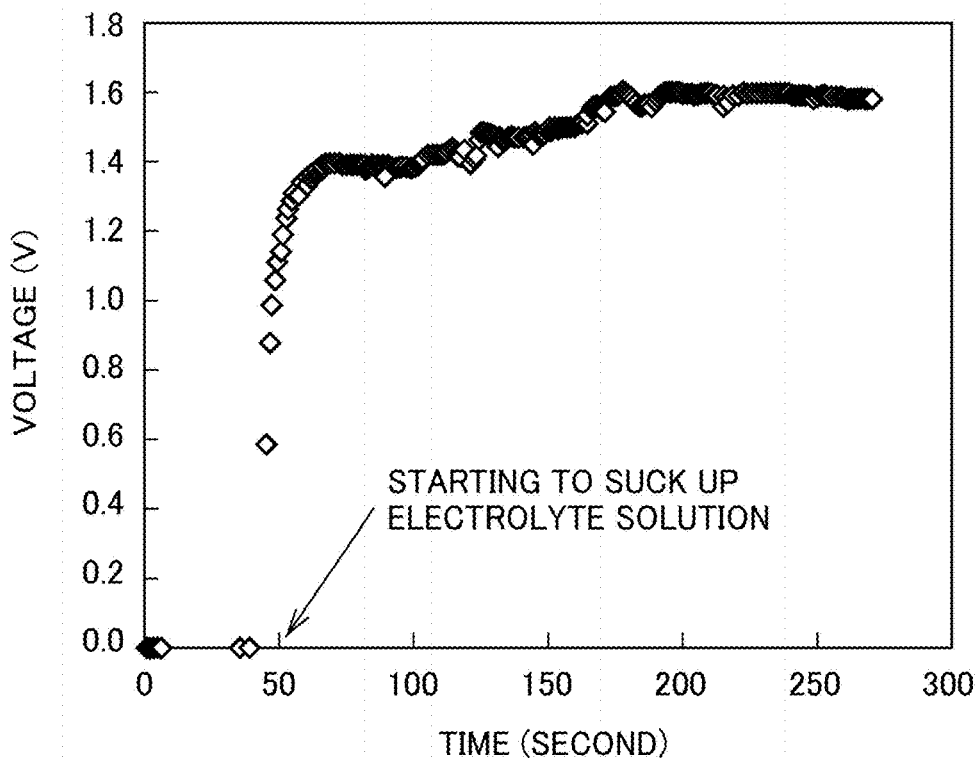
FIG. 6 is a diagram illustrating measurement results of the discharge voltage.

First, change in the voltage between the positive electrode 1 and the negative electrode 3, at the time when the exposed portion of the separator 5 exposed to the outside of the casing was caused to absorb 1 mol/l NaCl aqueous solution as electrolyte solution, is illustrated in FIG. 6. When the separator 5 sucks up the electrolyte solution, the voltage went up, and the voltage became stable approximately 200 seconds after the absorption start. The voltage then was approximately 1.6 V.

Figure 7:
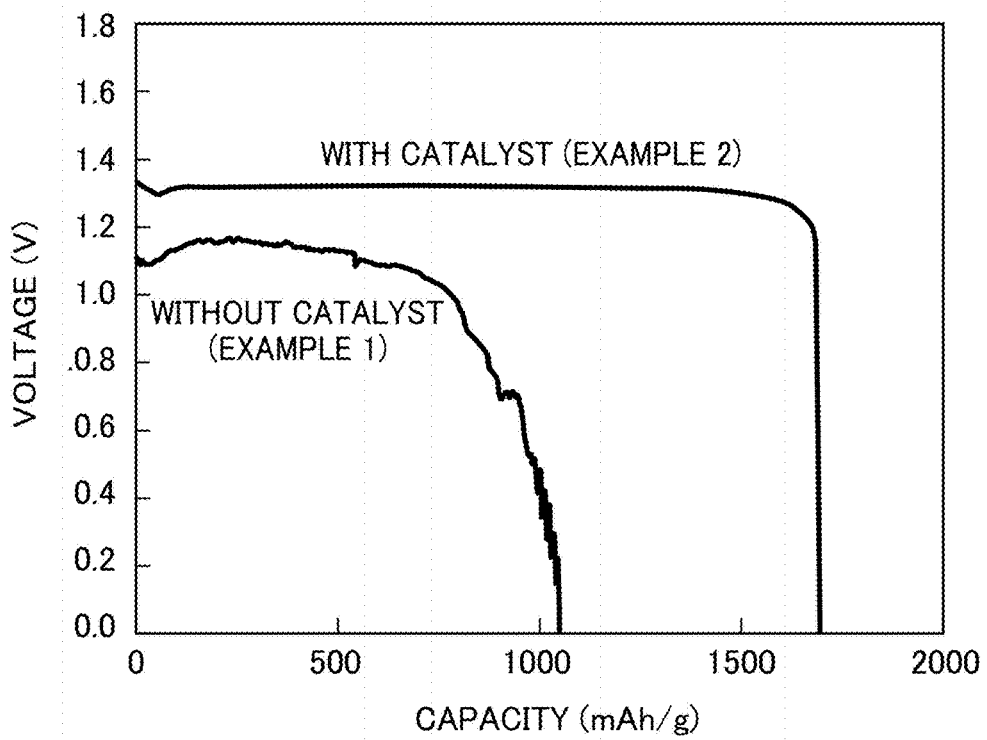
FIG. 7 is a diagram illustrating measurement results of the discharge voltage and the discharge capacity.

Next, a discharge test was conducted. In the discharge test of the primary battery 100, current is applied at an electric current density 2.0 mA/cm$^2$ as the electric current density per effective area of the positive electrode 1, using a commercially available charge/discharge measurement system (SD8 charge/discharge system manufactured by HOKUTO DENKO CORPORATION), and measurement was performed from the open circuit voltage until the battery voltage went down to 0V. In the discharge test of the primary battery 100, measurement was performed in a thermostatic chamber set at 25° C. (the atmosphere was in a normal living environment) while electrolyte solution is being supplied to the exposed portion of the separator 5 exposed from the casings 7a and 7b. The discharge capacity was shown as a value per weight (mAh/g) of the positive electrode 1 made of a bicontinuous material. The initial discharge curve in example 1 is illustrated in FIG. 7. FIG. 7 shows that the average discharge voltage is approximately 1.15 V, and the discharge capacity is approximately 1050 mAh/g.

Example 2

In example 2, description will be provided for a case where the positive electrode 1 (made of a stretchable bicontinuous material containing carbon nanofibers and having a three-dimensional network structure) in example 1 carries a catalyst. In the following, the positive electrode 1 carries manganese oxide ($MnO_2$) as a representative of the catalyst. Note that by changing Mn to a certain metal, a desired oxide can be carried as a catalyst.

A commercially available manganese (II) chloride tetrahydrate ($MnCl_2.4H_2O$, manufactured by KANTO CHEMICAL CO., INC.) was dissolved in distilled water and permeated into "a stretchable bicontinuous material containing carbon nanofibers and having a three-dimensional network structure" prepared by the method in example 1. Then, ammonia water (28%) was gradually added dropwise until the pH reaches 7.0 to neutralizes it and precipitate manganese hydroxide. To prevent chlorine from remaining in the precipitate, washing with distilled water was repeated five times.

The obtained carbon nanofibers carrying manganese hydroxide are heat-treated at 500° C. for six hours in an argon atmosphere to prepare carbon nanofibers carrying manganese oxide ($MnO_2$). Then, the prepared carbon nanofibers carrying manganese oxide is evaluated by XRD measurement. In the XRD measurement, a peak of manganese oxide ($MnO_2$, PDF (Powder Diffraction File) No. 00-011-079) was able to be observed. It was confirmed that the catalyst carried by the bicontinuous material was a single phase manganese oxide.

The method of preparing the primary battery 100 and the charge/discharge test method are the same as those in example 1. A discharge test was conducted using "the stretchable bicontinuous material containing carbon nanofibers and having a three-dimensional network structure" carrying manganese oxide for the positive electrode 1. The average discharge voltage of the primary battery 100 was approximately 1.32 V, and the discharge capacity was approximately 1700 mAh/g as illustrated in FIG. 7. Example 2 showed a higher average discharge voltage and also a larger discharge capacity than example 1 which does not carry manganese oxide ($MnO_2$) as a catalyst.

Example 3

In example 3, the structure of the primary battery 100 was changed to the one in FIG. 2, and a charge/discharge test was conducted while electrolyte solution is being supplied to the exposed portion of the separator 5, as in example 2.

The method of preparing the primary battery 100 in example 3 is the same as the one in example 2. Here, the separator 5 contains the electrolyte 8. Specifically, a separator was immersed in electrolyte solution for 30 minutes to make the separator carry NaCl as an electrolyte and then naturally dried in the atmosphere for one hour to obtain the separator 5 containing the electrolyte.

After the exposed portion of the separator 5 exposed to the outside of the casing was made to absorb tap water, a discharge test was conducted while electrolyte solution is being supplied to the exposed portion. The average discharge voltage of the primary battery 100 is approximately 1.25 V, the discharge capacity is approximately 1470 mAh/g, and thus both the discharge voltage and the discharge capacity were a little lower than those of example 2.

Example 4

In example 4, the structure of the primary battery 100 was changed to the one in FIG. 3, and a charge/discharge test was conducted while electrolyte solution is being supplied to the exposed portion of the separator 5, as in example 2.

The method of preparing the primary battery 100 in example 4 is the same as the one in example 2. Here, the separator 5 has a laminated structure. Specifically, a separator was immersed in electrolyte solution for 30 minutes to make the separator carry NaCl as an electrolyte and then naturally dried in the atmosphere for one hour to obtain the separator 5 containing electrolyte. Then the separator 5 was sandwiched between two separators that face to each other and contain no electrolyte, and thus has a three-layer structure.

After the exposed portion of the separator 5 exposed to the outside of the casing was made to absorb tap water, a discharge test was conducted while electrolyte solution is being supplied to the exposed portion. The average discharge voltage of the primary battery 100 is approximately 1.30 V, the discharge capacity is approximately 1690 mAh/g, and thus both the discharge voltage and the discharge capacity were approximately at the same level as those of example 2.

Note that after the primary battery 100 was discharged, the primary battery 100 was set in the soil. After about one month, decomposition of the casing was visually observed. It showed that the primary battery 100 was metabolized and decomposed by microorganisms in the soil.

Examples 5 to 7

In examples 5 to 7, metals used for the negative electrode 3 were a metal zinc plate (thickness: 200 µm, manufactured by the NIlaco Corporation) for example 5, an aluminum plate (thickness: 200 µm, manufactured by the NIlaco Corporation) for example 6, and an iron plate (thickness: 200 μm, manufactured by the NIlaco Corporation) for example 7, which are commercially available. Other than this, the primary battery 100 was prepared in the same manner as in example 2, and a discharge test was conducted while electrolyte solution is being supplied to the exposed portion of the separator 5. It was confirmed that each of them worked as a primary battery 100. The measurement results are shown in FIG. 8, together with those of examples 1 to 4.

Comparative Example 1

Discharge test results of known typical battery cell structures are disclosed as comparative examples for reference. In comparative example 1, the shape of the separator 5 was changed, the separator 5 was immersed in an electrolyte, and the moistened separator 5 was put in the casing and sealed. All other things are the same as those in example 2.

The separator 5 used was prepared by cutting out a 20 mm×mm square from a cellulosic separator for batteries (manufactured by NIPPON KODOSHI CORPORATION). Unlike the embodiment, it does not have an exposed portion exposed to the outside of the casing.

A negative electrode 3 and the separator 5 are placed on a negative-electrode-side casing 7b, and on top of them, a positive electrode 1, positive electrode current collector 2, and positive-electrode-side casing 7a are placed in order. After that, three sides of the peripheral edge portions of the two casings 7a and 7b were sealed by heat-sealing at 130° C. with a sealer. After electrolyte solution was injected into it to moisten the separator 5, the remaining one side was sealed by heat-sealing. Here, a portion (approximately 10 mm) of the peripheral edge portion of the casings 7a and 7b was left unsealed to form an air hole.

For the primary battery 100 prepared using a separator moistened in advance with a certain amount of electrolyte solution, the average discharge voltage was approximately 1.27 V, and the discharge capacity was approximately 130 mAh/g. Both the discharge voltage and the discharge capacity were lower than those of example 2.

Comparative Example 2

In comparative example 2, the shape of the separator 5 was changed, the peripheral edge portions of the casings 7a and 7b were sealed with a portion (approximately 10 mm) of the peripheral edge portions left unsealed to form an air hole, and then an electrolyte was injected into it. All other things were the same as those in example 2.

A negative electrode 3 and the separator 5 are placed on a negative-electrode-side casing 7b, and on top of them, a positive electrode 1, positive electrode current collector 2, and positive-electrode-side casing 7a are placed in order. After that, the four sides of the peripheral edge portions of the two casings 7a and 7b were sealed by heat-sealing at 130° C. with a sealer. Here, a portion (approximately 10 mm) of the peripheral edge portions of the casings 7a and 7b was left unsealed to form an air hole.

Through the air hole, a sufficient amount of electrolyte solution (3 mL) was injected into the primary battery 100 with an eyedropper. For the primary battery 100 thus prepared, the average discharge voltage was approximately 0.71 V, and the discharge capacity was approximately 510 mAh/g. Both the voltage capacity and the discharge capacity were much lower than those of example 2.

As has been described, it was confirmed that the primary battery 100 including the negative electrode 3 in the present embodiment, made of magnesium metal showed a discharge capacity larger than or equal to approximately 1000 mAh/g without carrying a catalyst and showed an average discharge voltage larger than or equal to approximately 1.3 V and a discharge capacity larger than or equal to approximately 1700 mAh/g with carrying a catalyst. It was also confirmed that the primary battery 100 operates as a battery with metals other than magnesium (for example, zinc, aluminum, and iron).

Further, for the primary battery having a known typical battery cell structure (comparative example 1), the discharge capacity was low at approximately 130 mA/g. This is conceivably because although electrolyte solution is always supplied from the exposed portion of the separator 5 without running out in the primary battery 100 according to the present embodiment, the amount of electrolyte solution is not sufficient in the structure as in comparative example 1.

For the primary battery having another known typical battery cell structure (comparative example 2), both the discharge voltage and the discharge capacity were much lower than those of example 2. This is conceivably because of corrosion of the negative electrode 1, which was observed, resulting from both faces of the negative electrode 3 and the positive electrode 1 being always in contact with electrolyte solution, and it is also conceivable that a sufficient amount of electrolyte solution (3 mL) was injected through the air hole formed at a portion of the peripheral edge portions of the casings 7a and 7b, so that both the separator-side face and the casing-side face of the positive electrode 1 were covered with the electrolyte, and the area in contact with the air was smaller than that of example 2, reducing the discharge capacity. It is also conceivable that the reason of the low average voltage is that the positive electrode 1, the separator 5, and the negative electrode 3 were not favorably in contact with one another.

The above results have shown that the primary battery 100 according to the present embodiment has excellent performance in both the voltage capacity and the discharge capacity.

As has been described above, since the present embodiment includes the separator 5 that sucks up electrolyte solution by the capillary phenomenon with the exposed portion exposed from the battery casing, the present embodiment provides an easy-to handle primary battery capable of spontaneous power generation in which self-discharge does not occur before use, and it requires only a small amount of electrolyte solution in use and is free from concerns about liquid leakage.

In addition, since the present embodiment includes the separator 5 which sucks up water by the capillary phenomenon with the exposed portion exposed from the battery casing, and contains an electrolyte, the present embodiment provide an easy-to handle primary battery capable of spontaneous power generation in which self-discharge does not occur before use, and it requires only a small amount of water in use and is free from concerns about liquid leakage.

Further, since in the present embodiment, electrolyte solution is not contained inside the battery casing before use, side reactions such as corrosion of the negative electrode 3 in the primary battery 100 can be suppressed, making it easy to handle. In addition, in the present embodiment, since electrolyte solution or water is sucked up in use to discharge, the discharge capacity of the primary battery 100 can be large.

Note that the primary battery 100 of the present invention is not limited to the structures described in the present embodiment, but it is apparent that various modifications and combinations can be made by those who skilled in the art within the technical scope of the present invention.

EXPLANATION OF THE REFERENCE NUMERALS

100 primary battery
1 positive electrode (positive electrode)
2 positive electrode current collector (positive electrode)
3 negative electrode (negative electrode)
4 negative electrode current collector (negative electrode)
5 separator
6 battery cell
7a positive-electrode-side casing
7b negative-electrode-side casing
8 electrolyte
9 alarm
200 moisture sensor

The invention claimed is:

1. A primary battery comprising:
a positive electrode and a negative electrode; and
a separator that is disposed between the positive electrode and the negative electrode and sucks up electrolyte solution by a capillary phenomenon with an exposed portion of the separator exposed from a battery casing, wherein the separator includes a first separator containing no electrolyte, a second separator containing an electrolyte, and a third separator containing no electrolyte stacked in order, the exposed portion includes the first, second, and third separators, the first, second, and third separators are made of a water absorbent material, and the first separator has a same configuration as the third separator, wherein
the positive electrode is made of a bicontinuous material having a three-dimensional network structure, and
when a length of the positive electrode is compressed in a load direction by 80% or less, the positive electrode is capable of going back to a shape it had before it was compressed.

2. A primary battery comprising:
a positive electrode and a negative electrode; and
a separator that is disposed between the positive electrode and the negative electrode, contains an electrolyte, and sucks up water by a capillary phenomenon with an exposed portion of the separator exposed from a battery casing, wherein the separator includes a first separator containing no electrolyte, a second separator containing an electrolyte, and a third separator containing no electrolyte stacked in order, the first, second, and third separators are made of a single water absorbent material, and the first and third separators have a same configuration, wherein
the positive electrode is made of a bicontinuous material having a three-dimensional network structure, and
when a length of the positive electrode is compressed in a load direction by 80% or less, the positive electrode is capable of going back to a shape it had before it was compressed.

3. The primary battery according to claim 1, wherein the negative electrode is made of any metal selected from magnesium, zinc, aluminum, and iron, or made of an alloy containing the metal as a main component.

4. The primary battery according to claim 1, wherein the exposed portion of the separator is exposed on a side opposite from a side on which a portion of a positive electrode current collector of the positive electrode and a portion of a negative electrode current collector of the negative electrode are exposed from the battery casing.

5. The primary battery according to claim 1, further comprising
a battery casing in an inside of which the positive electrode, the negative electrode, and the separator are disposed and which has an intake port to take air into the inside.

6. A moisture sensor comprising:
a positive electrode and a negative electrode;
a separator that is disposed between the positive electrode and the negative electrode, contains an electrolyte, and sucks up water by a capillary phenomenon with an exposed portion of the separator exposed from a battery casing, wherein the separator includes a first separator containing no electrolyte, a second separator containing an electrolyte, and a third separator containing no electrolyte stacked in order, the first, second, and third separators are each made of a single absorbent material, and the first and third separators have a same configuration; and
a sensor that detects a conduction between the positive electrode and the negative electrode as presence of water, the conduction being caused by the separator sucking up the water wherein
the positive electrode is made of a bicontinuous material having a three-dimensional network structure, and
when a length of the positive electrode is compressed in a load direction by 80% or less, the positive electrode is capable of going back to a shape it had before it was compressed.

* * * * *